United States Patent [19]

Pietryk et al.

[11] 4,428,533
[45] Jan. 31, 1984

[54] WINDSHIELD WIPER SHAFT BUSHING ASSEMBLY WITH WASHER JET

[75] Inventors: Erwin Pietryk, Cologne; Peter Fischer, Langenfeld; Axel Rauthmann, Pulheim, all of Fed. Rep. of Germany

[73] Assignee: Ford Motor Company, Dearborn, Mich.

[21] Appl. No.: 333,191

[22] Filed: Dec. 21, 1981

[30] Foreign Application Priority Data

Jan. 27, 1981 [DE] Fed. Rep. of Germany ....... 3102573

[51] Int. Cl.³ ............................................. B05B 15/06
[52] U.S. Cl. ............................................. 239/284 R
[58] Field of Search ................ 239/284 R, 284 A, 289

[56] References Cited

U.S. PATENT DOCUMENTS 2,729,507 1/1956 Wise ..................................... 239/284

FOREIGN PATENT DOCUMENTS 2537471 4/1976 Fed. Rep. of Germany .
966176 7/1962 United Kingdom .

Primary Examiner—John J. Love
Attorney, Agent, or Firm—Daniel M. Stock; Clifford L. Sadler; John J. Roethel

[57] ABSTRACT

In a wiper shaft bushing assembly with a washer jet for motor vehicle screens, in which the wiper shaft is guided in a wiper bushing and is surrounded by an elastic plastic sleeve in which a washer jet is located. The one-piece plastic sleeve surrounds the wiper bushing and the elongated wiper shaft preferably eccentrically. The sleeve has shaped in its wall located farthest from the wiper shaft a closed off liquid channel which is connected on the inner end to a lateral tube connection for connection to the washer pump and on its outer end to a ball socket for receiving a spherical directable nozzle body of the washer jet.

1 Claim, 2 Drawing Figures

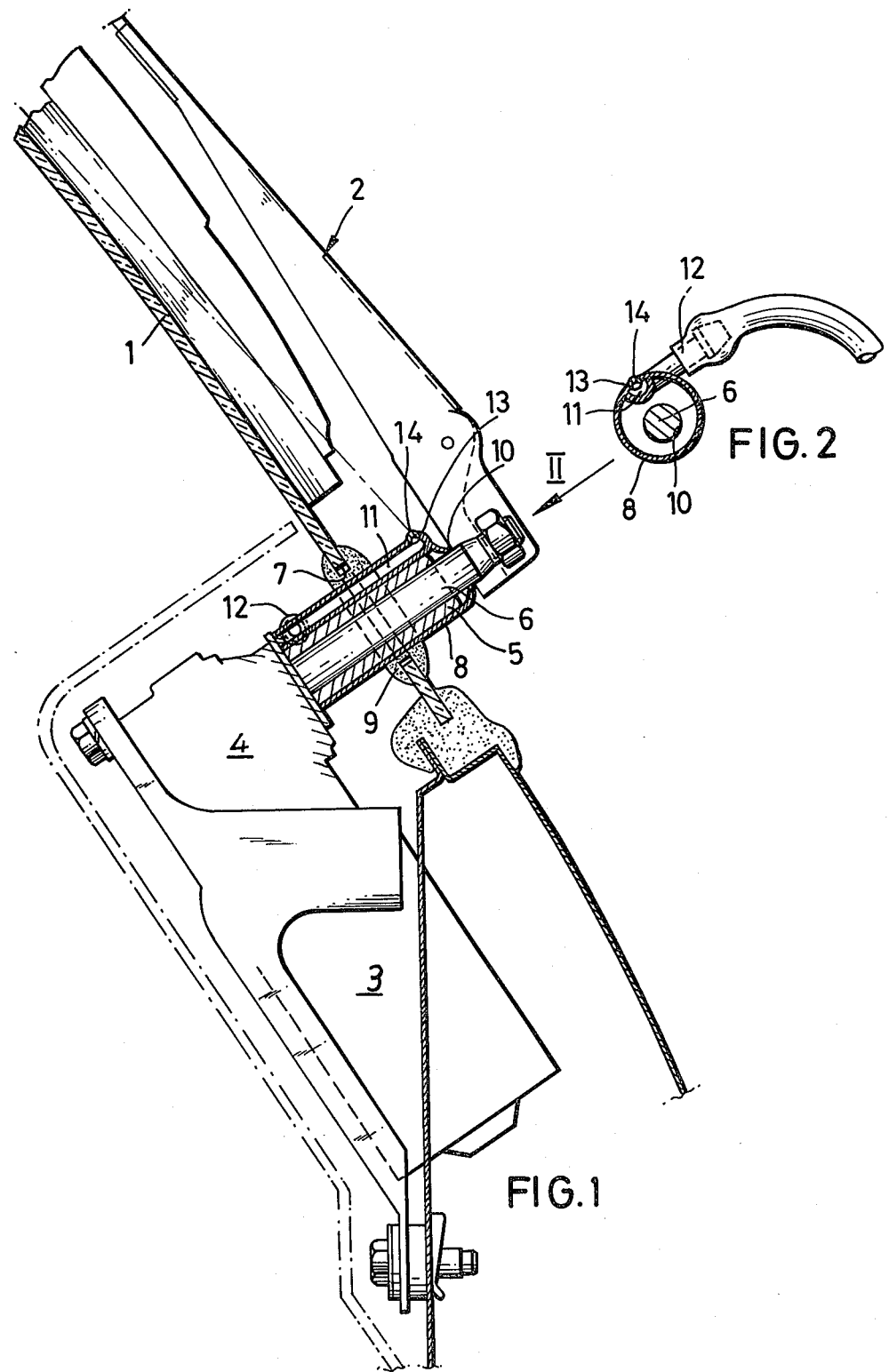

WINDSHIELD WIPER SHAFT BUSHING ASSEMBLY WITH WASHER JET

BACKGROUND OF THE INVENTION

This invention relates to a wiper shaft bushing assembly with a washer jet for motor vehicle screens.

A wiper shaft bushing assembly of approximately this type is known from British patent specification No. 966,176. In this wiper shaft bushing assembly the wiper bearing is guided through an aperture in the sheet metal of the vehicle body and is surrounded by an elastic plastic sleeve which is arranged concentrically thereto and consists of several parts in one of which a washer jet is located. This known arrangement has the disadvantage that the multi-part plastic sleeve is difficult to assemble and cannot be sealed off very well.

A further wiper shaft bushing assembly of approximately this type is known from German Offenlegungsschrift No. 2,537,471. In this known arrangement a channel is made within the wiper bearing guided through the aperture in the sheet metal of the vehicle body and this channel extends eccentrically thereto and is connected to a washer jet. This known arrangement has the disadvantage that the wiper bearing has to be made correspondingly wide and unsymmetrical.

The object of this invention is to improve a wiper shaft bushing assembly with a washer jet for motor vehicle screens in such a way that with a minimum of outlay in terms of material and with as simple a manufacture as possible an arrangement of the washer jet which is stylistically faultless and inconspicuous is obtained.

SUMMARY OF THE INVENTION

The present invention relates to a shaft bushing for a windshield wiper mechanism, the shaft bushing incorporating a jet for directing washer fluid spray on the windshield. A one-piece plastic sleeve surrounds the wiper bushing and an elongated wiper shaft projecting through the bushing. The sleeve preferably is arranged so that its longitudinal axis is eccentrically displaced relative to the axis of the shaft. The sleeve has in its wall portion farthest from the wiper shaft a liquid channel which is connected at its inner end to a lateral tube connection and at its outer end to a ball socket for receiving a spherical directable nozzle body.

The outer end of the plastic sleeve is provided with a sealing lip engageable with the wiper shaft to seal off the latter against the penetration of dirt and water.

DESCRIPTION OF THE DRAWINGS

Other objects, advantages and features of the present invention will become more apparent as the description proceeds, reference being had to the accompanying drawings, wherein:

FIG. 1 shows a vertical section along the wiper shaft axis of a window wiper installation; and FIG. 2 shows a view in the direction of the arrow II in FIG. 1.

DETAILED DESCRIPTION OF THE INVENTION

FIG. 1 illustrates a rear window wiper installation in which a wiper arm 2 sweeping over the rear window 1 is driven by a wiper motor 3 located in the interior of the motor vehicle. The wiper motor 3 is supported on the body of the motor vehicle via an appropriate retaining plate 4.

The wiper shaft 6 driving the wiper arm 2 is guided in a wiper bushing 5 in the region of the gearing 4 connected to the wiper motor 3. The elongated wiper shaft 6 extends through an aperture 7 in the rear window 1 and is surrounded by a one-piece plastic sleeve 8 which is sealed off relative to the aperture 7 in the rear window 1 via a sealing ring 9.

The one-piece plastic sleeve 8 has a substantially cylindrical shape and is supported on the wiper bushing 5 and on the gearing of the motor 3. The sleeve 8 surrounds the outer end of the elongated wiper shaft 6 via an annular sealing lip 10. The one-piece plastic sleeve 8 preferably is arranged with its axis eccentrically to the axis of the elongated wiper shaft 6 and has formed in its wall located farthest from the wiper shaft 6 a liquid channel 11 which is connected at its inner end to a lateral tube connection 12 and at its outer end to a ball socket 13 for a spherical directable nozzle body 14.

It can easily be seen from FIGS. 1 and 2 that the water supply to the water jet nowhere encounters swiveling parts of the wiper installation so that a perfect leakproof passage of the washer liquid is easily guaranteed. The elastic plastic sleeve not only ensures the passage of the washer liquid but also acts as a bushing for the wiper shaft through the window in a favorable stress-free way. At its outer end it also provides an appropriate sealing off of the wiper shaft via its appropriately designed sealing lip 10.

It is to be understood that this invention is not limited to the exact construction illustrated and described above, but that various changes and modifications may be made without departing from the spirit and scope of the invention as defined in the appended claims.

We claim:

1. A wiper shaft bushing assembly with a washer jet for motor vehicle screens in which the wiper shaft is guided in a wiper bushing and is surrounded by an elastic plastic sleeve in which a washer jet is located, wherein the improvement comprises:

a one-piece plastic sleeve that eccentrically surrounds the wiper bushing and the elongated wiper shaft and which has formed in its wall located farthest from the wiper shaft a liquid channel which is connected on its inner end to a lateral tube connection and on its outer end to a ball socket for receiving a spherical directable nozzle body and which has formed at its outer end an annular sealing lip for sealing off the wiper shaft guided therein.

* * * * *